July 2, 1929.  T. BENNETT ET AL  1,719,418
SEPTIC TOILET TANK
Filed Jan. 20, 1928

INVENTORS
Thomas Bennett,
and Ambrose D. Sloane
John W. Fortenbaugh
by Parker & Prochnow ATTORNEYS Patented July 2, 1929.

1,719,418

UNITED STATES PATENT OFFICE.

THOMAS BENNETT AND AMBROSE D. SLOANE, OF PERRY, AND JOHN W. FORTEN-BAUGH, OF BUFFALO, NEW YORK, ASSIGNORS TO KAUSTINE COMPANY, INC., OF PERRY, NEW YORK.

SEPTIC TOILET TANK.

Application filed January 20, 1928. Serial No. 248,171.

This invention relates to septic toilet tanks and more particularly to septic toilet tanks of that kind which are positioned directly underneath the toilets in such a manner that the sewage is dropped directly into the tank.

The objects of this invention are to provide a septic tank of this kind with a series of baffle plates arranged below the drop tube sleeve in such a manner as to prevent gas rising from the material in the bottom of the tank from passing upwardly through the liquid in the lower end of the drop tube sleeve; also to improve the construction of septic toilet tanks in other respects hereinafter specified.

In the accompanying drawings.

Our invention is illustrated in the accompanying drawings as applied to a cylindrical septic toilet tank having its axis arranged horizontally, the tank including a shell having a cylindrical wall A and end walls B and B'. The tank includes the usual discharge tube or outlet 5 arranged in the end wall B, and a manhole 6 through which the tank may be cleaned. A tank of other shape than that shown may, of course, be employed without departing from this invention. A drop tube sleeve 7 or other tubular member is suitably secured in the upper portion of the cylindrical wall A of the tank and extends downwardly to below the liquid level of the tank. The liquid level is, of course, determined by the lower portion of the discharge tube 5, so that the drop tube sleeve 7 extends below the level of the lower portion of the discharge tube 5. The toilet is arranged directly above the drop tube sleeve 7, so that the sewage drops from the toilet directly into the tank through the drop tube sleeve, no flushing water being used in an installation of this kind.

Figure 1:
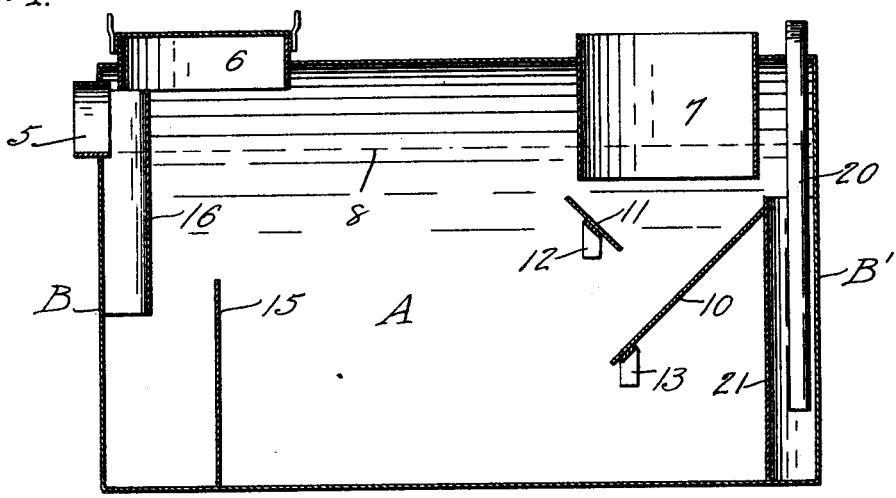
Fig. 1 is a central sectional elevation of a septic toilet tank embodying this invention.
Figure 2:
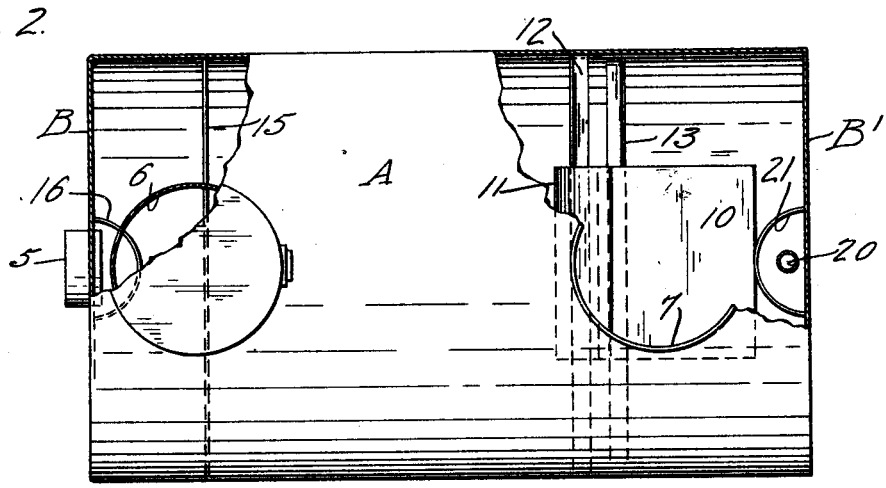
Fig. 2 is a top plan view thereof partly in section.

In septic toilet tanks of this kind the disposal of the sewage is effected by fermentation or bacteriological action, resulting in the formation of a scum on the top of the liquid in the tank, the collection of a sludge in the lower part of the tank, and the evolution of a certain amount of gas from the sewage and sludge in the bottom of the tank. The scum on the top of the tank is essential to the proper functioning of a septic tank and the breaking up or disturbing of the scum interferes with the proper disposal of the sewage. Consequently by extending the lower end of the drop tube sleeve 7 downwardly below the liquid level in the tank, which is indicated by the broken line 8, Fig. 1, the disturbance of the scum is avoided. Furthermore by extending the drop tube sleeve below the level of the liquid in the tank the gases which collect at the top of the tank cannot escape upwardly through the drop tube sleeve.

In tanks of this kind as heretofore constructed, the greater part of the sewage is deposited in the tank immediately beneath the drop tube sleeve and consequently the greatest amount of evolution of gas takes place at this point, which gases pass upwardly into the drop tube sleeve, from where they pass upwardly through the toilet. In order to prevent the escape of gases through the drop tube sleeve in this manner, we provide a baffle plate or deflector 10 beneath the drop tube sleeve 7. This deflector is arranged at an angle in such a manner that material dropping thereon slides or is deflected toward the central portion of the tank and out of vertical alinement with the drop tube sleeve 7. Preferably a second baffle plate 11 is provided which is inclined in the opposite manner so that material dropping on the deflector or baffle plate 11 will slide from this plate and drop on the plate 10, which plate in turn deflects the sewage toward the center of the tank. These baffle plates may be mounted in the tank in any suitable or desired manner, for example, by means of straps or supports 12 and 13 which have their ends secured to the cylindrical wall A of the tank and have their intermediate portions secured to the baffle plates 11 and 10 respectively. The upper edge of the baffle plate 10 may rest against or may be secured to a portion of the tank.

These baffle plates in addition to the function described of causing the sewage to be deposited in the portion of the tank not in vertical alinement with the drop tube sleeve 7, also have the further function that any gas evolved in the lower portion of the tank beneath the drop tube sleeve 7, in passing upwardly will strike the under surface of either the baffle plates 10 or 11 and since the upper edges of these baffle plates extend outwardly beyond the cylindrical walls of the drop tube sleeve, and since the edges of these baffle plates overlap, such gases will be deflected laterally beyond the cylindrical walls of the drop tube sleeve 7 and can therefore not pass through the drop tube sleeve nor upwardly through the toilet.

In order that the liquid discharged from the tank through the discharge opening 5 may be as free as possible from solid matter, a pair of baffles is preferably employed, which may be arranged as follows:—A sludge baffle or wall 15 is arranged at a short distance from the end wall B of the tank in which the discharge pipe 5 is arranged. This sludge baffle 15 is in the form of a substantially semicircular plate extending upwardly from the bottom, the peripheral edges of which are secured to the cylindrical outer wall A of the tank and the flat upper edge of which extends crosswise of the tank approximately half way between the top and bottom of the tank. A second baffle 16 is so constructed that liquid can pass to the outlet 5 only from the space between the sludge wall 15 and the end wall B of the tank. The baffle 16 may be of any suitable construction for accomplishing this purpose, that shown being semi-cylindrical in form and secured to the end wall B of the tank in such a manner that the upper edge of the baffle 16 extends around the discharge outlet 5 of the tank and has its upper edge arranged sufficiently above the liquid level, indicated by 8, to prevent any of the scum in the tank from escaping through the discharge opening 5, and the lower portion of the baffle 16 preferably extends below the level of the upper edge of the sludge baffle 15. Consequently liquid from the central portion of the tank passes over the sludge baffle 15 and must then pass downwardly before it can enter into the baffle 16. Consequently any solid matter contained in the liquid which passes over the sludge baffle 15 will tend to continue its downward course and settle on the bottom of the tank. By means of the arrangement of the baffles 15 and 16, only clear liquid free from sludge and scum passes through the discharge opening 5 of the tank. Other means for controlling the flow of liquid through the discharge outlet of the tank may, however, be provided.

The action within the septic toilet tank is improved if some water is added from time to time to dilute the sewage. This may readily be effected by draining the discharge from a wash basin into the septic toilet tank. In order to provide for the introduction of this drain water into the septic toilet tank, and at the same time to prevent the escape of any gases through the drain pipe, the following construction is preferably employed. 20 represents a drain pipe which extends downwardly into the tank, and 21 represents a baffle or wall extending around the drain pipe 20 and extending upwardly from the bottom of the septic toilet tank, the baffle or wall 21 in the particular construction shown being semi-cylindrical in form and having its longitudinal edges secured to the end wall B' of the tank, and its lower edges to the lower part of the cylindrical portion A of the tank. The baffle 21 is also so located that none of the material entering into the tank through the drop tube sleeve 7 can drop into the space confined by the baffle or wall 21. Consequently the space within this baffle 21 will be filled substantially only with liquid discharged through the drain pipe 20, and since the sludge will be kept away from below the drain pipe 20 by means of the baffle 21, no gases will be generated below the drain pipe 20, so that no gases will pass upwardly through the drain pipe. Furthermore since the drain pipe extends below the level of the liquid in the tank, none of the gases in the top of the tank will be discharged through the drain pipe and also neither the scum at the top of the liquid level in the tank nor the sludge in the bottom of the tank will not be interfered with or stirred up by water passing into the tank through the drain pipe, which water eventually passes into the intermediate portion of the tank over the upper edges of the baffle or wall 21. The construction described has another advantage in connection with septic toilet tanks used in country schools, churches, or other buildings, which are not continuously heated during cold weather in that no other trap need be provided in the drain pipe 20 than that formed by the pipe 20 and baffle 21, and since the entire tank must be located in the ground below the frost line, or in some other location where it is protected from frost, no freezing of the trap can result. The baffle wall 21 also causes the liquid entering the tank to be introduced to the portion of the tank in which fermentation or bacteriological action takes place at a lesser rate of flow than that at which it passes through the drain pipe 20, thus further preventing disturbing of the contents of the tank. The water entering into the tank through the drain pipe not only helps the disintegrating action which takes place within the tank, but also, since a considerable portion of the water entering the tank through the drain pipe will probably be warm, the temperature within the tank is raised by the addition of such water, which also tends to improve the fermentation or bacteriological action which takes place within the tank. Other means for providing for the admission of water through a drain pipe and for forming a trap or seal within the tank may, however, be provided, if desired.

The septic toilet tank described is of simple and inexpensive construction and is very effective in its action, and prevents the escape of gas from the tank through the toilet or drain pipe.

Claim:—

In a septic toilet tank the combination of a shell, a drop tube sleeve secured to the upper portion of said shell and extending downwardly below the liquid level in said tank, and a pair of baffle plates arranged beneath said drop tube sleeve and inclined downwardly and toward each other from opposite sides of said sleeve, the lower edge of one of said plates terminating at a distance from the surface of the other plate, and said other plate extending beneath the lower edge of said first mentioned plate, whereby sewage dropping through said drop tube sleeve is deflected toward one side thereof, and whereby gas evolved underneath said tube is deflected laterally by the under surfaces of said baffles beyond the sides of said drop tube sleeve.

THOMAS BENNETT.
AMBROSE D. SLOANE.
JOHN W. FORTENBAUGH.